United States Patent [19]

de Jong et al.

[11] Patent Number: 5,040,867
[45] Date of Patent: Aug. 20, 1991

[54] SLIDE FIT OPTICAL CONNECTOR HAVING END CAP TO PREVENT ROTATION

[75] Inventors: Michael de Jong; David L. Dean, both of Hickory, N.C.

[73] Assignee: Siecor Corporation, Hickory, N.C.

[21] Appl. No.: 496,900

[22] Filed: Mar. 21, 1990

[51] Int. Cl.$^5$ .............................................. G02B 6/36
[52] U.S. Cl. ................................................... 385/60
[58] Field of Search .............. 350/96.20, 96.21, 96.22, 350/96.23

[56] References Cited

U.S. PATENT DOCUMENTS

| | | | |
|---|---|---|---|
| 4,354,731 | 10/1982 | Mouissie | 350/96.20 X |
| 4,634,214 | 1/1987 | Cannon, Jr. et al. | 350/96.20 |
| 4,787,704 | 5/1988 | Knecht et al. | 350/96.21 |
| 4,812,006 | 3/1989 | Osborn et al. | 350/96.20 X |
| 4,898,446 | 2/1990 | Hinckley | 350/96.20 |
| 4,929,046 | 5/1990 | Barlow | 350/96.21 |

OTHER PUBLICATIONS

Amphenol Termination Procedure 949-1002, Issue 2 (10/87).

Primary Examiner—John D. Lee
Assistant Examiner—Phan T. Heartney
Attorney, Agent, or Firm—J. David Abernethy

[57] ABSTRACT

A fiber optic connector having a slotted housing has an interior ribbed member projecting through the housing slot. A dust cap is rotatably fixed to the housing to prevent rotation while a tool slides a locking member over the housing slot to force the ribbed member inwards, centering optical fibers. A portion of the connector is factory built so that users need use no epoxies or curing devices.

8 Claims, 5 Drawing Sheets

SLIDE FIT OPTICAL CONNECTOR HAVING END CAP TO PREVENT ROTATION

BACKGROUND OF THE INVENTION

The field of the invention is fiber optic connectors.

As fiber optic local area networks and the telephony subscriber loop begin to make a large impact on the market for fiber optic connectors and splices, users are finding that most connectors were not designed for field installation. This was not a problem when installation of connector pigtails, that is, a predetermined length of fiber to be joined to a system fiber with a splice, was the norm; but direct connectorization is now becoming common. Installing a typical fiber optic connector requires a lengthy process of heat curing epoxy and polishing the fiber end. Other connectors have eliminated the epoxy and polish steps, but they do so at the expense of performance and longevity. Still other connectors rely on ultraviole cured adhesive to secure a fiber into a splice. While this method is quicker and easier than the heat cured epoxy method, it requires the user to have an adhesive which has a finite shelf life and an ultraviolet curing lamp.

Therefore, there is seemingly a need for connectors requiring no epoxy or curing in the field but maintaining desirable performance and longevity.

BRIEF SUMMARY OF THE INVENTION

The connector according to the invention is designed to allow the curing and polishing steps usually performed in the field for fiber optic connectorization to be moved into the factory. In the field, the steps to complete connectorization are similar to those for installing a mechanical splice. This process is accomplished by centering the connector through a slide fit process, keeping the connector rotationally and longitudinally stable while doing so, and securing the optical fiber to be connected by crimping. The resulting connector can then be placed into communication with other connectors through the use of standard connector sleeves and connector sleeve adapters.

BRIEF DESCRIPTION OF THE DRAWINGS

The following detained description of the preferred embodiment is made with reference to the several figures, in which.

DETAILED DESCRIPTION OF THE PREFERRED EMBODIMENT

Figure 1:
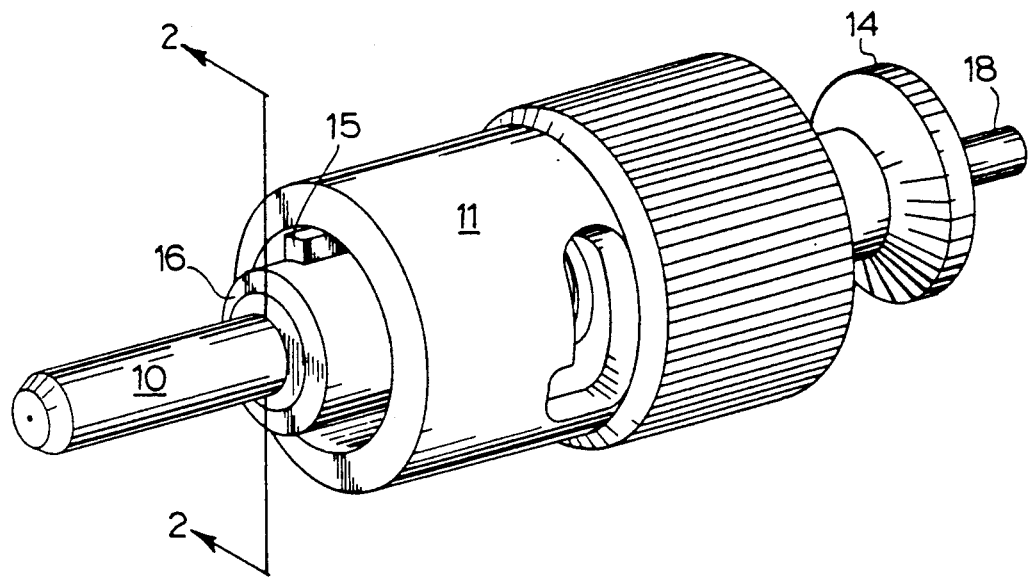
FIG. 1 is an enlarged perspective view of the connector prior to introduction of the optical fiber to be connected.
Figure 2:
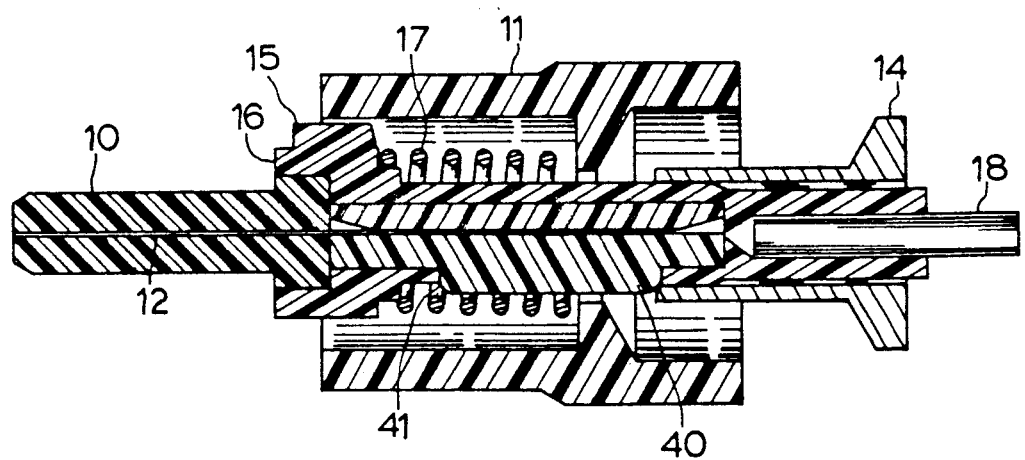
FIG. 2 is a longitudinal sectional view of the apparatus shown in FIG. 1 along sectional lines 2—2 of FIG. 1.

The portion of the connector which is preassembled in the factory is as shown in FIGS. 1 and 2. Optical fiber 12 is placed in ferrule 10, with one end of optical fiber 12 being polished to a smooth finish with the end of ferrule 10 having the smaller outer diameter. The other end of optical fiber 12 is cleaved and extends to the middle of housing 11. Optical fiber 12 may be secured within ferrule 10 by an epoxy.

A centering assembly is placed into housing 16. The preferred centering assembly is that shown in U.S. Pat. 4,787,704, issued to Knecht and Dean, which is incorporated herein by reference.

Knecht and Dean show in FIG. 1 thereof a frame 11, rods 15-17 and 16-18, and lid 10, all of which may be utilized in this preferred embodiment. To the curved portion of frame 11 of Knecht and Dean is now attached first rib 40, which extends through slot 41 of housing 16. In practice, rods 15-17 and 16-18 of Knecht and Dean are placed in channel 19 of frame 11 of Knecht and Dean (as modified by attaching first rib 40 thereto). Then first rib 40 is inserted using tweezer into housing 16 with first rib 40 placed through housing slot 41. Then lid 10 of Knecht and Dean is inserted into housing 16. Optical fiber 12 is then coated with epoxy and inserted into ferrule 10. The assembly of ferrule and fiber is then fitted into housing 16 and the centering assembly, respectively, as shown in FIGS. 1 and 2 herein. The outside of metal crimp tube 18 is coated with epoxy and fitted to housing 16 as shown in FIGS. 1 and 2.

Figure 9:
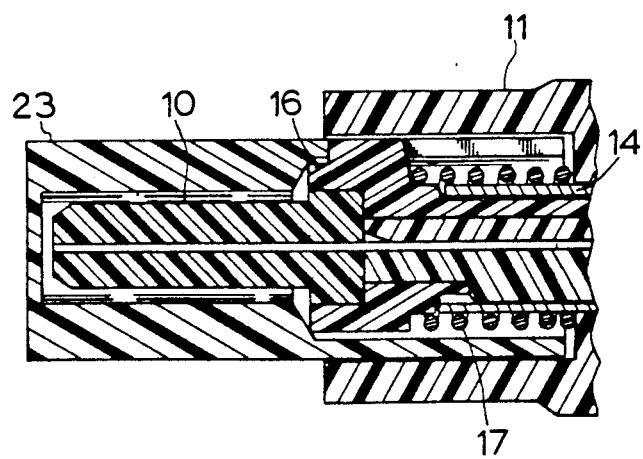
FIG. 9 is an enlarged fragmentary sectional view of the apparatus shown in FIG. 1 with the end cap inserted.

Next referring to FIG. 9, dust cap 23 is formed of a rigid plastic, having a slot 39 and opposing small exterior knobs, one of which is visible, to connect with bayonet 11 as described below. Dust cap 23 is placed over ferrule 10 with slot 39 fitted on housing rib 15 to lock end cap 23 and housing 16 with respect to rotation. Coil spring 17 is then placed over housing 16 from the end opposite dust cap 23. Bayonet 11 is then placed over spring 17, bayonet 11 turned so that the exterior knobs of dust cap 23 fit into its interior grooves. Slider (locking member) 14 is then placed over the tip of housing 16 opposite dust cap 23. The apparatus at this point is as shown in FIGS. 1 and 2, with the addition of end cap 23 as shown in FIG. 9.

Figure 3:
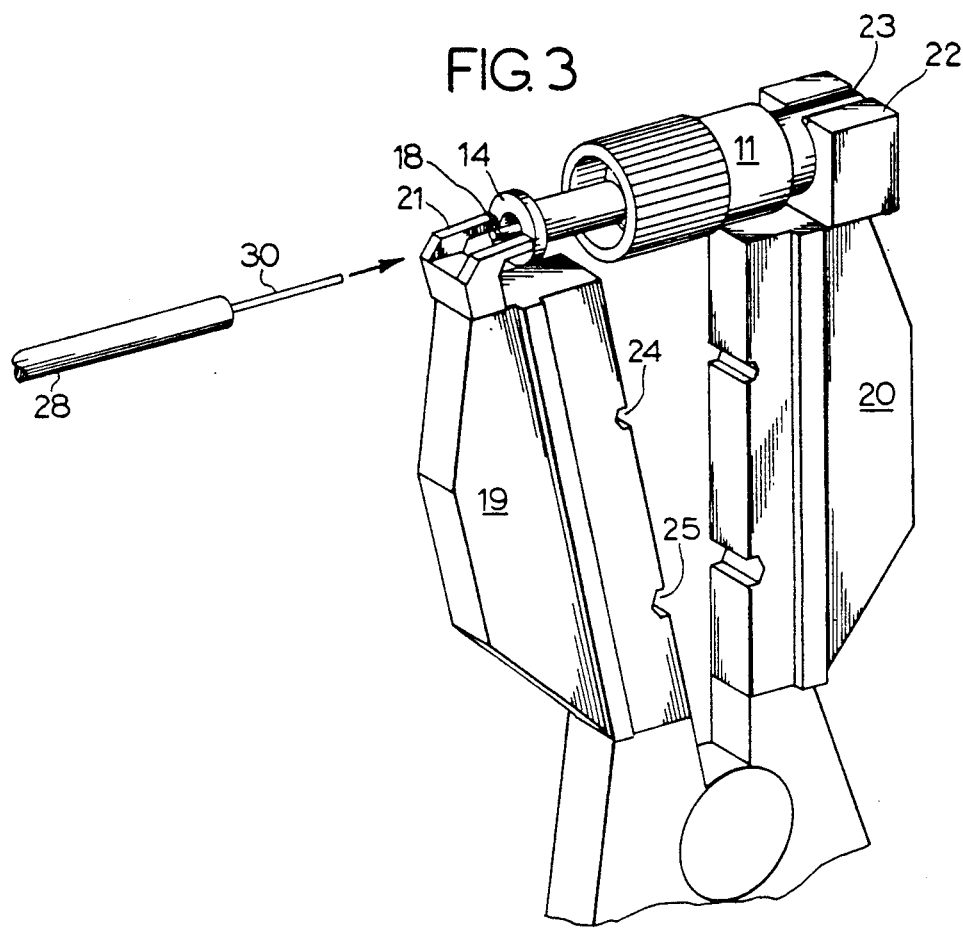
FIG. 3 is a perspective view of the process of introducing the optical fiber to be connected into the apparatus of FIG. 1 while such apparatus is held by an insertion tool.
Figure 4:
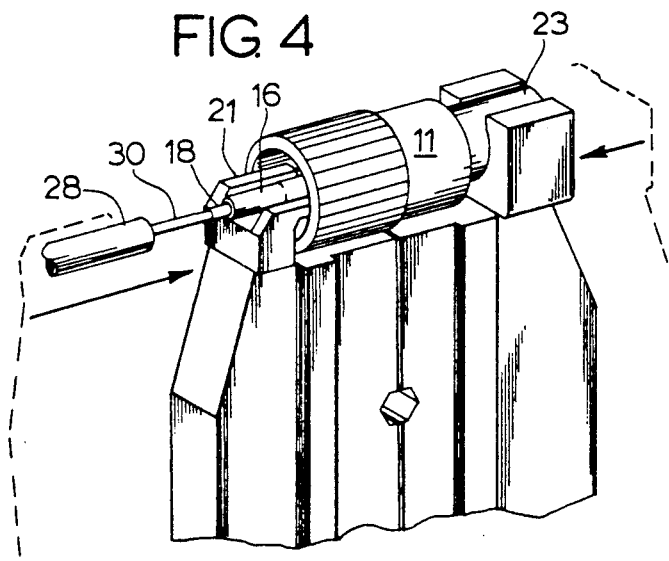
FIG. 4 is an expanded fragmentary view of FIG. 3 after the tool has moved the sliding member.
Figure 5:
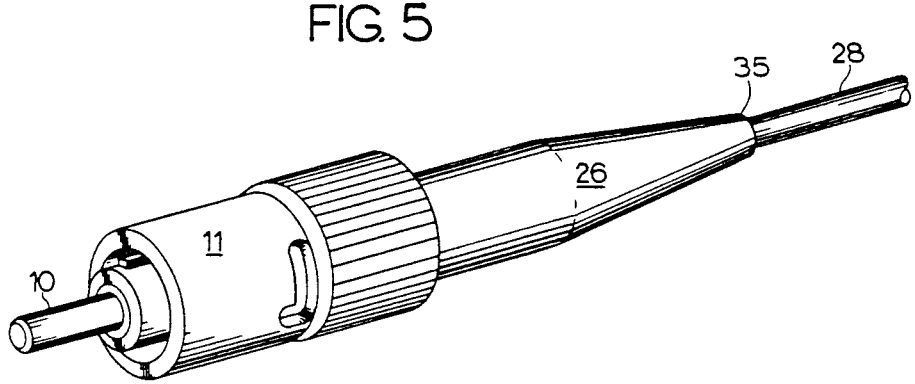
FIG. 5 is a perspective view of the completed connector joined to an optical fiber in a cable.
Figure 6:
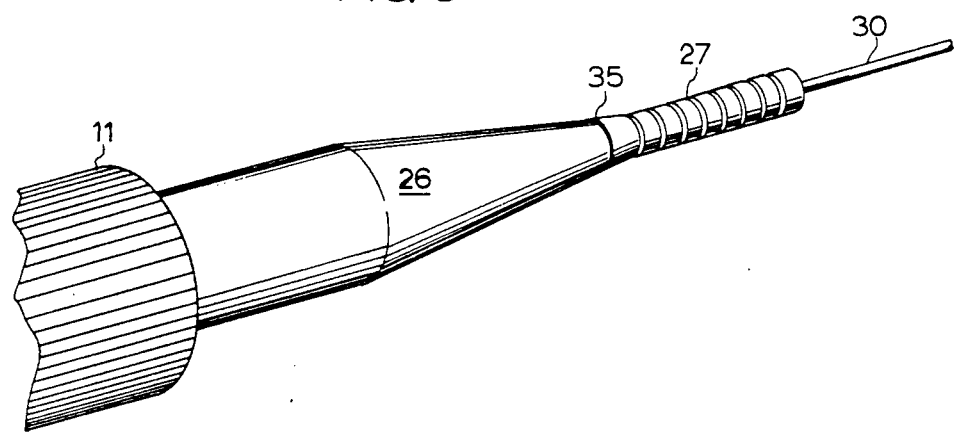
FIG. 6 is a perspective view of the connector joined to a buffered optical fiber.

The user now takes in hand cable 28 which is to be affixed to the connector. Cable 28 is inserted through boot 26 and crimp ring 32. The connector assembly is placed into a crimping tool as shown in FIG. 3. The crimping tool has jaws 19 and 20, which are terminated with one terminal end 22 shaped to grip end cap 23 to prevent its rotation and another terminal end 21 having fingers to apply force to slider 14. The end portion of cable 28 is stripped away, revealing buffered optical fiber 30, which is properly stripped, cleaved and loaded through crimp tube 18 until it meets the terminal end of optical fiber 12. The tool is closed as shown in FIG. 4, slider 14 urged inward to slide to the second position over tab 40, urging tab 40 radially inward through slot 41 to center the connector.

Figure 7:
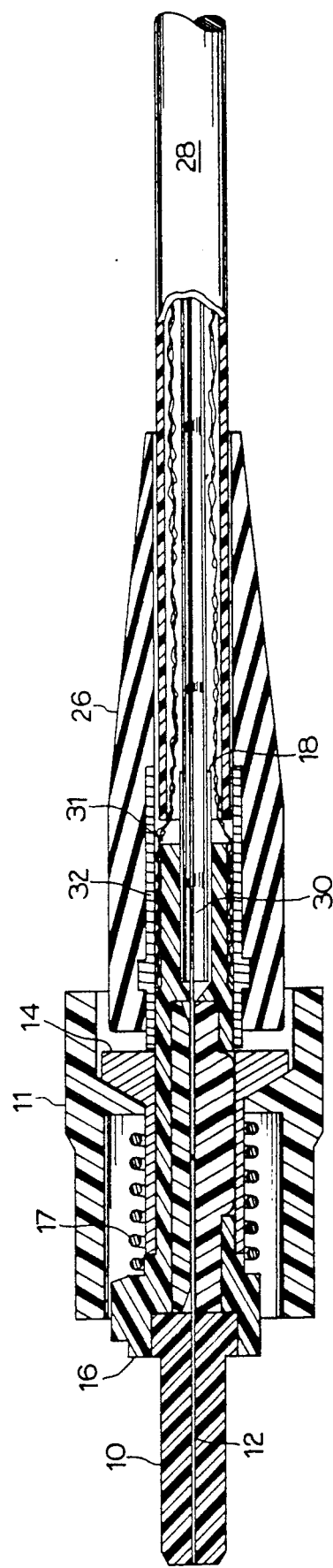
FIG. 7 is a longitudinal sectional view of the completed connector of FIG. 5.
Figure 8:
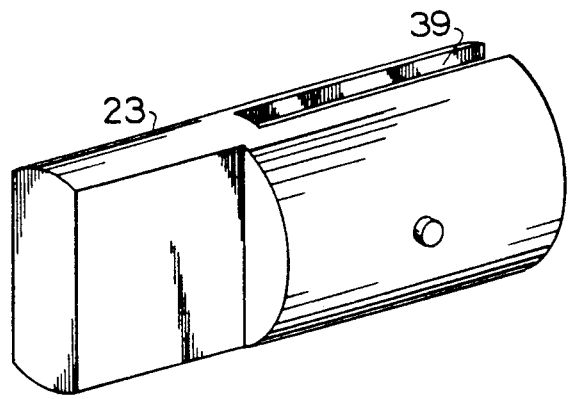
FIG. 8 is an enlarged perspective view of the end cap.

Hole 24 of the crimp tool is then used to crimp tube 18. With reference o FIG. 7, strength members 31 are spread over the exterior of housing 16, crimp ring 32 is placed over housing 16 and strength members 31, and tool hole 2 is used to crimp the crimp ring 32. Boot 26 is then placed over crimp ring 32. Boot 26 may be scored at notch 35 to accommodate cable 28.

What is claimed is:

1. A fiber optic connector, comprising:
   (a) a longitudinally extending housing having an inner surface delimiting a first space, said housing having an outer surface and a first slot extending from the outer surface to the inner surface;
   (b) a first body carried by the housing within the first space, the first body having a first rib extending through the first slot;
   (c) a locking member carried on the outer surface of the housing adapted to slide in the longitudinal direction of the housing from a first position not covering the slot to a second position covering the slot; and,
   (d) securing means for holding the locking member in the second position to force the first rib radially inward with respect to the housing.

2. A fiber optic connector as recited in claim 1 wherein the locking member abuts the first rib when the locking member is in the second position to force the first rib radially inward with respect to the housing.

3. A fiber optic connector as recited in claim 1, further comprising an optical fiber within the first space.

4. A fiber optic connector as recited in claim 3, further comprising a crimping tube carried outside the housing.

5. A fiber optic connector as recited in claim 3, further comprising a ferrule held by the housing and means for preventing rotation of the ferrule during movement of the sliding means.

6. A fiber optic connector as recited in claim 3, further comprising a second rib mounted to the exterior of the housing and a slotted end member over the housing such that the second rib engages the slotted member.

7. A fiber optic connector as recited in claim 6, further comprising a tool for applying compressive longitudinal force on the slotted end member and the locking member, the tool and the slotted end member having mating exterior surfaces preventing rotation of the slotted end member while compression is applied by the tool.

8. A fiber optic connector as recited in claim 6, further comprising a tool holding the slotted end member in a fixed position with respect to rotation and urging the sliding member from the first to the second position.

* * * * *